(12) United States Patent
Horne et al.

(10) Patent No.: US 7,305,476 B2
(45) Date of Patent: Dec. 4, 2007

(54) METHOD AND SYSTEM FOR NETWORK SYNCHRONIZATION AND ISOLATION

(75) Inventors: Lyman D. Horne, Salt Lake City, UT (US); Ronald S. Leahy, Salt Lake City, UT (US); W. Paul Willes, Alpine, UT (US); Michael J. Miller, Pleasant Grove, UT (US); Samuel C. Kingston, Salt Lake City, UT (US); Douglas M. Grover, Elk Ridge, UT (US)

(73) Assignee: Phonex Broadband Corporation, Midvale, UT (US)

( * ) Notice: Subject to any disclaimer, the term of this patent is extended or adjusted under 35 U.S.C. 154(b) by 0 days.

(21) Appl. No.: 10/770,057

(22) Filed: Feb. 1, 2004

(65) Prior Publication Data

US 2005/0198396 A1 Sep. 8, 2005

(51) Int. Cl.
*G06F 15/16* (2006.01)
(52) U.S. Cl. .................. 709/227; 709/209; 709/223; 709/225; 709/228; 709/248
(58) Field of Classification Search ............... 709/200, 709/227, 248; 713/375
See application file for complete search history.

(56) References Cited

U.S. PATENT DOCUMENTS

| 5,068,877 | A | 11/1991 | Near et al. ................ 375/107 |
|---|---|---|---|
| 6,034,963 | A | 3/2000 | Minami et al. ............. 370/401 |
| 6,128,318 | A | 10/2000 | Sato ............................ 370/503 |
| 6,339,796 | B1* | 1/2002 | Gambino .................... 709/248 |
| 6,373,899 | B1 | 4/2002 | Krasner ...................... 375/259 |
| 6,442,145 | B1 | 8/2002 | De Lange et al. .......... 370/310 |
| 6,473,797 | B1 | 10/2002 | Hirasawa .................... 709/224 |
| 6,477,568 | B2 | 11/2002 | Borrett et al. .............. 709/223 |
| 6,553,420 | B1* | 4/2003 | Karger et al. ............... 709/226 |
| 6,839,759 | B2* | 1/2005 | Larson et al. ............... 709/228 |
| 6,907,044 | B1* | 6/2005 | Yonge et al. ................ 370/445 |
| 6,907,472 | B2* | 6/2005 | Mushkin et al. ............ 709/248 |
| 2002/0061009 | A1* | 5/2002 | Sorensen ..................... 370/351 |
| 2004/0261101 | A1* | 12/2004 | Iwamura ..................... 725/32 |

* cited by examiner

*Primary Examiner*—Jason Cardone
*Assistant Examiner*—Nicholas R Taylor
(74) *Attorney, Agent, or Firm*—Snell & Wilmer L.L.P.

(57) ABSTRACT

A network synchronization method designed to provide synchronization of multiple networks and devices. This invention provides a specific method for determining which nodes are responsible for network synchronization as nodes fail or cannot see each other due to conditions on the network. This allows for fault tolerance in a network in which conditions change dynamically. In addition, this invention uses synchronization codes and network numbers to isolate separate networks using the same physical medium, thus allowing sharing of network resources.

10 Claims, 6 Drawing Sheets

METHOD AND SYSTEM FOR NETWORK SYNCHRONIZATION AND ISOLATION

BACKGROUND OF INVENTION

1. Field of the Invention

This invention relates to electronic communication systems. More specifically, this invention relates to synchronizing and isolating networks within an electronic communications system.

2. Description of Related Art

A variety of schemes have been used in communication systems to synchronize devices on a network. Typically, such methods are used to provide synchronization and redundancy if a node providing synchronization fails. These systems typically are used on a single conditioned network and are not designed to meet the requirements of power line or wireless communication networks. Although these references may not constitute prior art, for a general background material, the reader is directed to the following United States Patents, each of which is hereby incorporated by reference in its entirety for the material contained therein: U.S. Pat. Nos.: 6,473,797, 6,128,318, 6,442,145, 6,373,899, 5,068,877, 6,477,568, 6,034,963.

SUMMARY OF INVENTION

It is desirable to provide a method that synchronizes and determines which node or nodes are responsible for network synchronization that is adapted to the needs of a communication network.

Therefore it is a general object of an embodiment of this invention to provide a method for synchronizing one or more networks.

It is a further object of an embodiment of this invention to provide a method for synchronizing multiple networks using different synchronization codes.

It is a further object of an embodiment of this invention to provide a method for creating networks within networks using synchronization codes and network numbers.

It is a further object of an embodiment of this invention to provide a method for synchronizing multiple networks on a power line network, a wireless network, a light frequency network and/or a wired network.

It is a further object of an embodiment of this invention to provide a method for determining which node provides synchronization on a network.

It is a further object of an embodiment of this invention to provide a method for determining if another node is providing the same synchronization code for the network by looking at non-synchronization time slots for the synchronization codes so an arbitration process can begin so only one node provides synchronization.

It is a further object of an embodiment of this invention to provide a method for determining which node or nodes provides synchronization for multiple networks.

It is a further object of an embodiment of this invention to provide a method for determining which node or nodes provide synchronization when two or nodes providing synchronization can communicate with one another.

It is a further object of an embodiment of this invention to provide a method for determining which node or nodes provide synchronization on a power line network.

It is a further object of an embodiment of this invention to provide a method for determining which node or nodes provide synchronization on a wireless network.

It is a further object of an embodiment of this invention to provide a method for determining which node or nodes provide synchronization based on an external source such as a user or application.

These and other objects of this invention will be readily apparent to those of ordinary skill in the art upon review of the following drawings, detailed description, and claims. In the present preferred embodiment of this invention, the network synchronization method makes use of a novel synchronization scheme which allows multiple networks on the same physical medium. In addition there is a novel process for determining which nodes are responsible for providing synchronization on the network.

BRIEF DESCRIPTION OF DRAWINGS

In order to show the manner that the above recited and other advantages and objects of the invention are obtained, a more particular description of the present preferred embodiments of this invention, which are illustrated in the appended drawings, is described as follows. The reader should understand that the drawings depict only present preferred and best mode embodiments of the invention, and are not to be considered as limiting in scope. A brief description of the drawings is as follows:

FIG. 1c is a flow diagram of the preferred process to determine which Sync Master Control Node to synchronize to.

Reference will now be made in detail to the present preferred embodiment of the invention, examples of which are illustrated in the accompanying drawings.

DETAILED DESCRIPTION

Figure 1A:
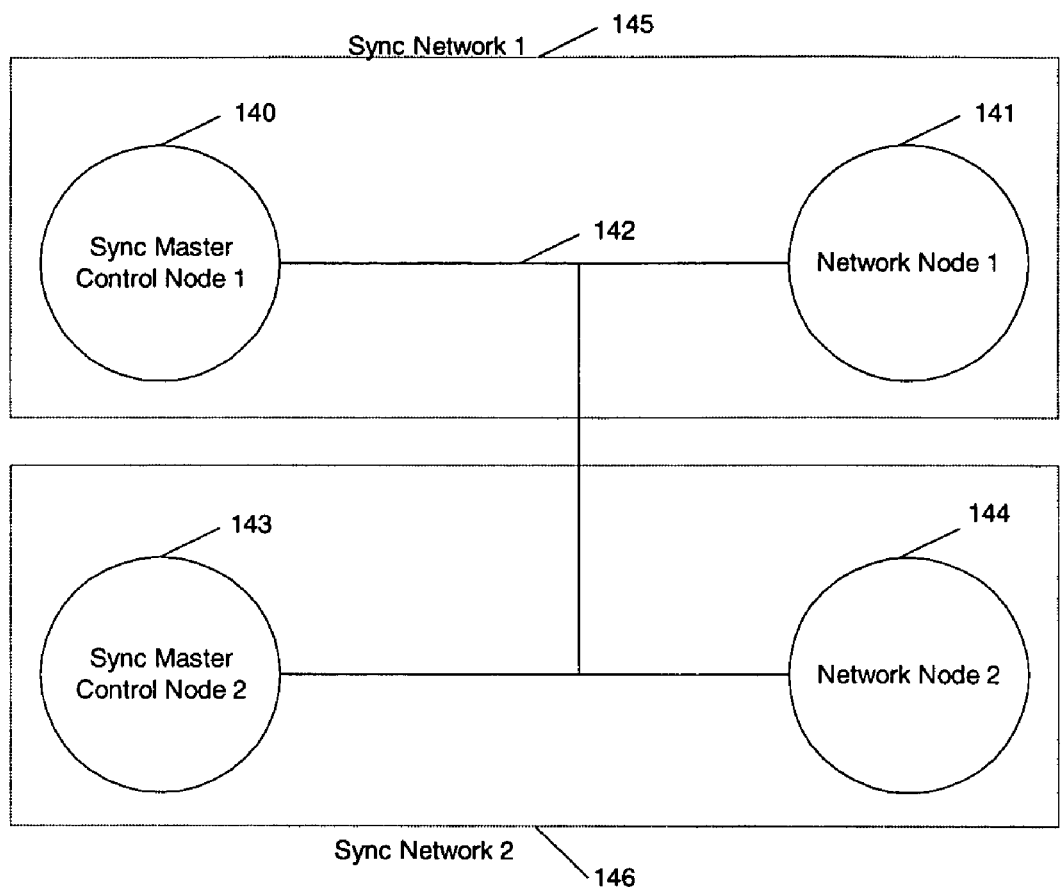
FIG. 1a is a diagram of the present preferred sync network.

FIG. 1a is a diagram of the present preferred sync network. In this document when referring to a network node in the singular, while referencing the single node with multiple nodes indicates that all referenced nodes can perform the same function as the single network node. A physical network 142 comprises a plurality of nodes 140, 141, 143, 144. Sync networks 145 and 146 are created when a sync master control node 140, 143 sends a synchronization code in a time slot 120-136 which is detected by a network node 140, 141, 143, 144 which synchronizes to the sync master control node 140, 143 forming a sync network 145, 146.

Figure 1B:
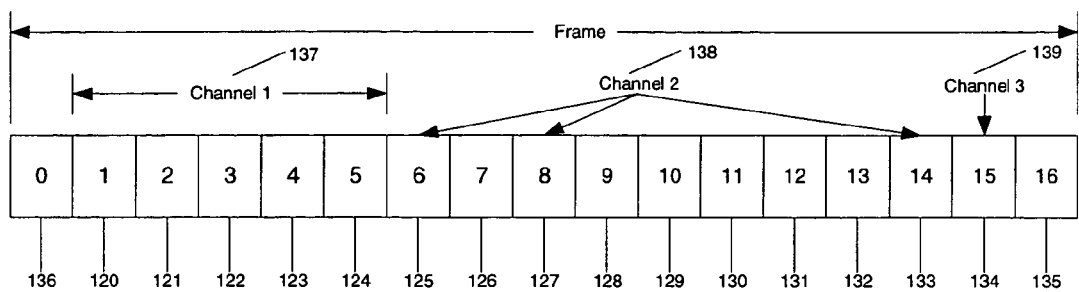
FIG. 1b is a diagram of the time division multiplexed data transfer mechanism of the present preferred embodiment of this invention used to transfer data on a sync network.

FIG. 1b is a diagram of the time division multiplexed data transfer mechanism of the present preferred embodiment of this invention used to transfer data on a sync network 145, 146. Transfer of data across a physical network 142 occurs in two forms: packets which are broken up into segments and non-packet. Examples of data include but are not limited to voice, audio, control, video, and computer information and the like. A frame represents the bandwidth of the sync network 145, 146 over time and consists of a plurality of time slots 120-136. Time slots 120-136 in the present preferred embodiment are equal size pieces of Time Division Multiplexed (TDM) bandwidth which is used to transfer data over the AC power line. Each time slot is presently 10 bits wide. The actual data sent is presently 32 bits with 22 bits used for forward error correction which results in 10 bits for each time slot. This is a 5/16 rate code. In the present preferred embodiment, time slot 136 is used for frame synchronization across a sync network 145, 146 by sending synchronization codes in time slot 136. Alternatively, any time slot or group of time slots can be used to send synchronization codes. Time slots 120-135 are used for data transfer. Data is sent using active channels, which are pieces of bandwidth. An active channel is a variable or fixed size pipe made up of a single time slot or a plurality of time slots used to form a packet or non-packet pipe. For example, an active channel 137 can include, but is not limited to, a group of contiguous slots 120-124. On the other hand, an active channel 138 can consist of noncontiguous slots 126, 128, 133. In addition, an active channel can comprise a single time slot 139 or any number of time slots up to the maximum number of time slots in the frame. An active channel is created by a bandwidth master control node which is a network node responsible for creating active channels 137, 138, and 139 on a network 142. Any network node can assume the role of bandwidth master control node.

Figure 1C:
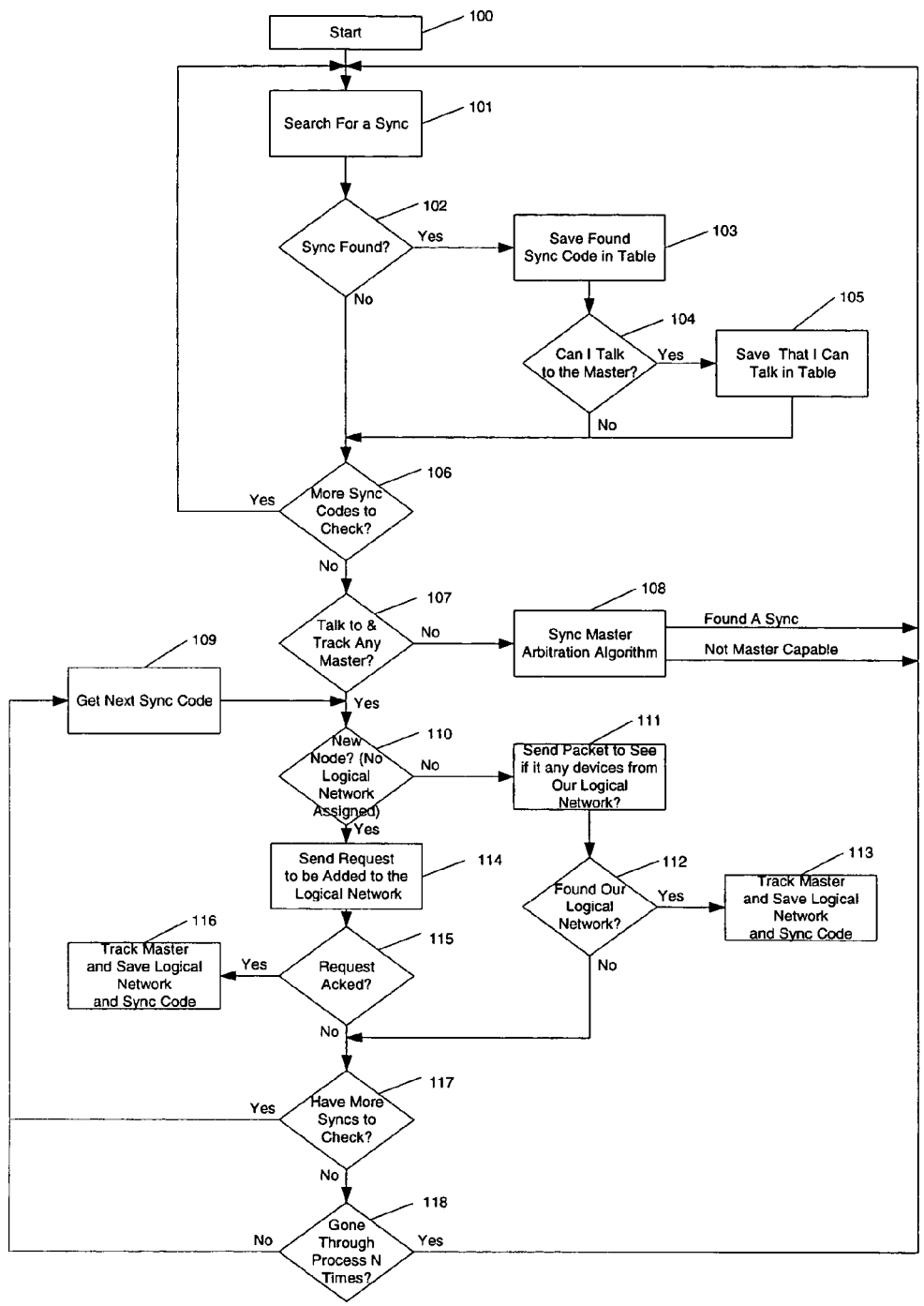

When a network is first created, there may be multiple network nodes 140, 143 on the physical network 142 that can provide synchronization for the sync network 145, 146. When a network node 140, 141, 143, 144 powers up for the first time, the network node 140, 141, 143, 144 must find the sync master control node 140, 143. The network node 140, 141, 143, 144 is added to a sync network 145, 146 and gets a network number or identifier which identifies a logical network within the sync network 145, 146. In addition, there is a bandwidth master control node responsible for bandwidth allocation on the sync network 145, 146. The sync master control node and the bandwidth master control node may be the same node or can be different nodes on the sync network 145, 146. Once the sync network 145, 146 is isolated using the synchronization code, the bandwidth master control node allocates bandwidth for use in the sync network 145, 146 by allocating channels 137-139. FIG. 1c is a flow diagram of the preferred process to determine which sync master control node 140, 143 to synchronize to. The process begins 100. The network node 140, 141, 143, 144 that is coming up looks for a synchronization code. A synchronization code is a periodic bit pattern that the network node 140, 141, 143, 144 locks onto which uses one or more time slots 120-136. In the present preferred embodiment, the synchronization code is a unique pattern that is ten bits long and is sent in a single time slot 136. Additionally, two time slots 120, 136 can use two sync codes to synchronize different sync networks 145, 146. This can be done by one sync master control node 140 synchronizing to a second sync master control node 143 in one time slot 136 and providing synchronization in another time slot 120. The different synchronization codes allow sync networks 145, 146 to be isolated on the same physical network 142 by tracking different synchronization codes. Time slots 120-135 are not used for synchronization and are typically used to transfer data. Time slots 120-135 are referred to as non-synchronization time slots or data time slots. The network node 140, 141, 143, 144 scans 101 in time to determine where the synchronization code is. There are one or more synchronization codes that the network node 140, 141, 143, 144 looks for. If at test 102 the network node 140, 141, 143, 144 finds one of these synchronization codes, the network node 140, 141, 143, 144 saves 103 the synchronization code for use later in a table. The network node 140, 141, 143, 144 tries to communicate 104 with a sync master control node providing synchronization 140, 143. If the network node 140, 141, 143, 144 can send and receive one or more packets 104 from the sync master control node 140, 143, the network node 140, 141, 143, 144 saves 105 the node address of the sync master control node 140, 143 that the network node 140, 141, 143, 144 communicated with. The reason it is preferred that the network node 140, 141, 143, 144 talk to the syncing sync master control node is: if the communication between the network nodes 140, 141, 143, 144 and the sync master control node 140, 143 is marginal, the network node 140, 141, 143, 144 may only be able to see the synchronization code and may be unable to send and receive valid packets. A test 106 is made to determine if there are more sync codes to check. The network node 140, 141, 143, 144 gets a new synchronization code to look for 101 if all the synchronization codes have not been checked 106. After each synchronization code has been checked, a test is made 107 to determine if the network node 140, 141, 143, 144 can talk to any sync master control node 140, 143. If not, the process goes to the sync master arbitration algorithm 108. Step 108 is the start of FIG. 2 or step 200. If at test 107, it was determined that the network node 140, 141, 143, 144 can talk to and track a sync master control node 140, 143, test 110 is checked to see if the network node 140, 141, 143, 144 has been assigned a logical network number. The logical network number is used to determine which network nodes 140, 141, 143, 144 are on a specific logical network. The same network node 140, 141, 143, 144 can be on different logical networks. If the network node 140, 141, 143, 144 has been assigned a logical network number, the network node 140, 141, 143, 144 sends 111 out a packet to see if any other devices from the networks node's 140, 141, 143, 144 logical network are active. If the network node 140, 141, 143, 144 finds any other network nodes 140, 141, 143, 144 on the same logical network in test 112, the network node 140, 141, 143, 144 tracks the sync master control node 140, 141 providing synchronization and stores 113 off the synchronization code and logical network number. Otherwise, the process goes to test 117. If in test 110, the network node 140, 141, 143, 144 has not been assigned a logical network address, the network node 140, 141, 143, 144 sends out a request 114 to be added to the logical network. If the response is acknowledged in test 115, the network node 140, 141, 143, 144 tracks the sync master control node 140 143 and saves 116 the synchronization code and logical network number. If the request to be added to a logical network in test 115 is not acknowledged or negatively acknowledged, the process goes to test 117. Test 117 checks to see if there are any more synchronization codes to check for. If there are more synchronization codes to check, the process starts over in step 109 by getting the next synchronization code. If there are no more synchronization codes to check for in test 117, the process goes to test 118. Test 118 checks to see how many times the process has gone through the synchronization process. If the process has been executed to many times, the whole process is started over by searching 101 for a synchronization code. This way the network node 140, 141, 143, 144 keeps searching for a logical network and a sync master control node 140, 143. Otherwise, if test 118 is yes, the process gets 109 the next synchronization code.

Figure 2:
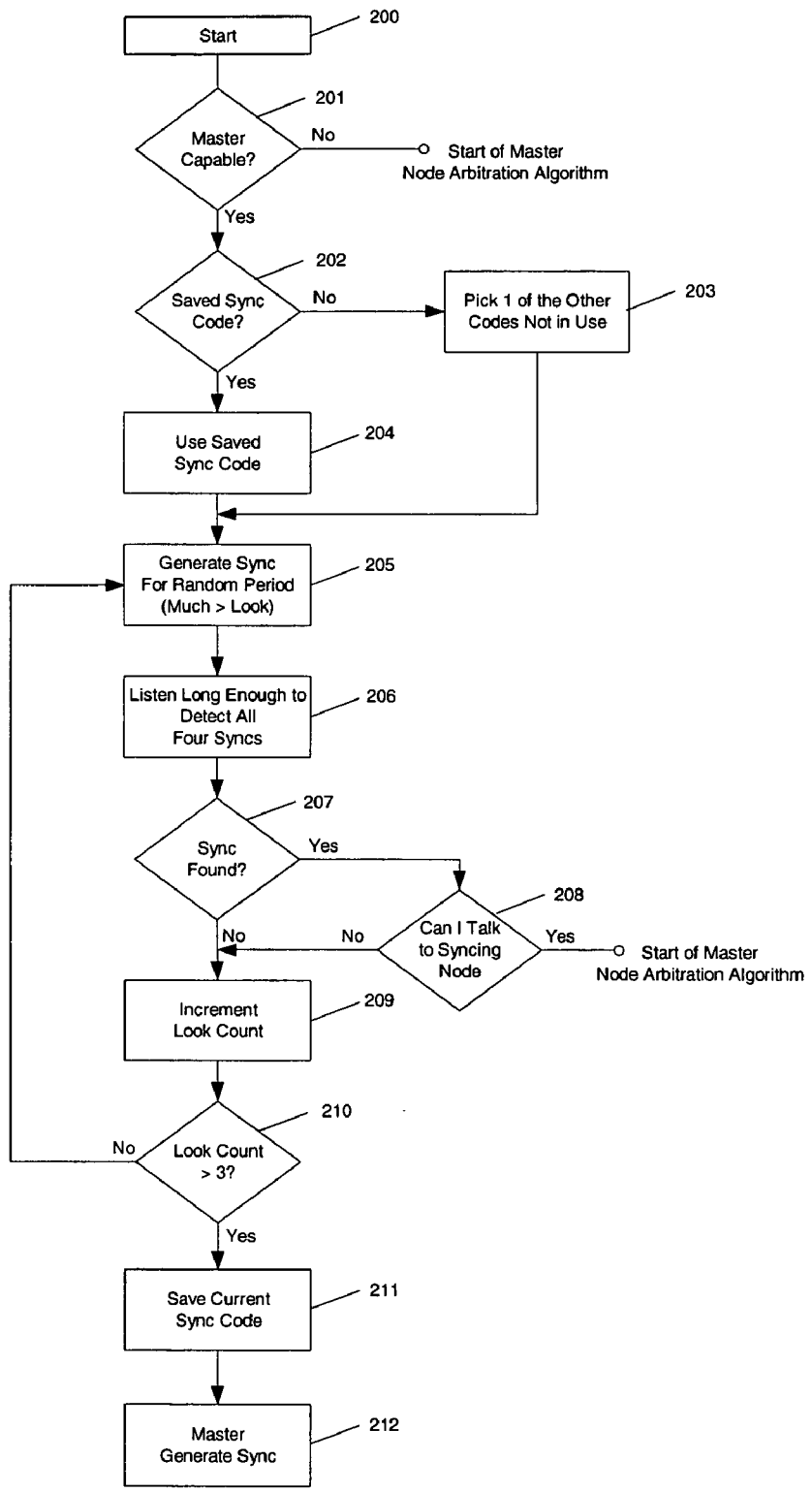
FIG. 2 is a flow diagram of the preferred process a node that goes through to determine if it is the Sync Master Control Node.

FIG. 2 is a flow diagram of the present preferred process that a network node 140, 141, 143, 144 goes through to determine if the network node 140, 141, 143, 144 is a sync master control node 140, 143 which provides synchronization on a sync network 145, 146. The process starts 200. The network node 140, 141, 143, 144 checks 201 to see if the network node 140, 141, 143, 144 can provide network synchronization (be a sync master control node) in test 201. If not, the process goes start of the master node arbitration algorithm (step 100 in FIG. 1c). Otherwise, the network node 140, 143 which can be a sync master control node 140, 143 checks 202 to see if the network node 140, 143 has tracked a sync master control node 140, 143 previously by checking to see if the network node 140, 143 saved a synchronization code. If not, the network node 140, 143, picks 203 a synchronization code not in use. Otherwise, the network node 140, 143, uses 204 the saved synchronization code. At step 205, the network node 140, 143, generates the synchronization code for a random period of time. This time is greater than the time the network node 140, 143 looks for a synchronization code, which allows other network nodes 140, 141, 143, 144 to see the network node's 140, 143 synchronization code. The network node 140, 143 listens 206 long enough to detect all four sync codes. If at test 207 a synchronization code was found, the network node 140, 143 tries to talk to the sync master control node 140, 143 which is providing the synchronization code in test 208. If the network node 140, 143 can talk, the master node arbitration algorithm process is started (step 100 in FIG. 1). Otherwise, test 208 goes to step 209. If test 207 fails and there was no synchronization code found, the process goes to step 209 was well. In step 209 the look count value is increased. The look count is a value used to determine how many times the network node has looked for a sync master control node. If the count is not greater than a predetermined value, that the process for looking for, the network node 140, 143 generates 205 a synchronization code on a time slot 136 for a random period of time. In the present preferred embodiment the look count is three, but this is not a requirement. If the look count in test 210 has been reached the network node 140, 143 gets the synchronization code from either step 204 or 203 and saves 211 the synchronization code. The network node 140, 143 becomes a sync master control node 140, 143 and starts providing synchronization 212 for the sync network 145 or 146 using the synchronization code stored in step 211.

Figure 3:
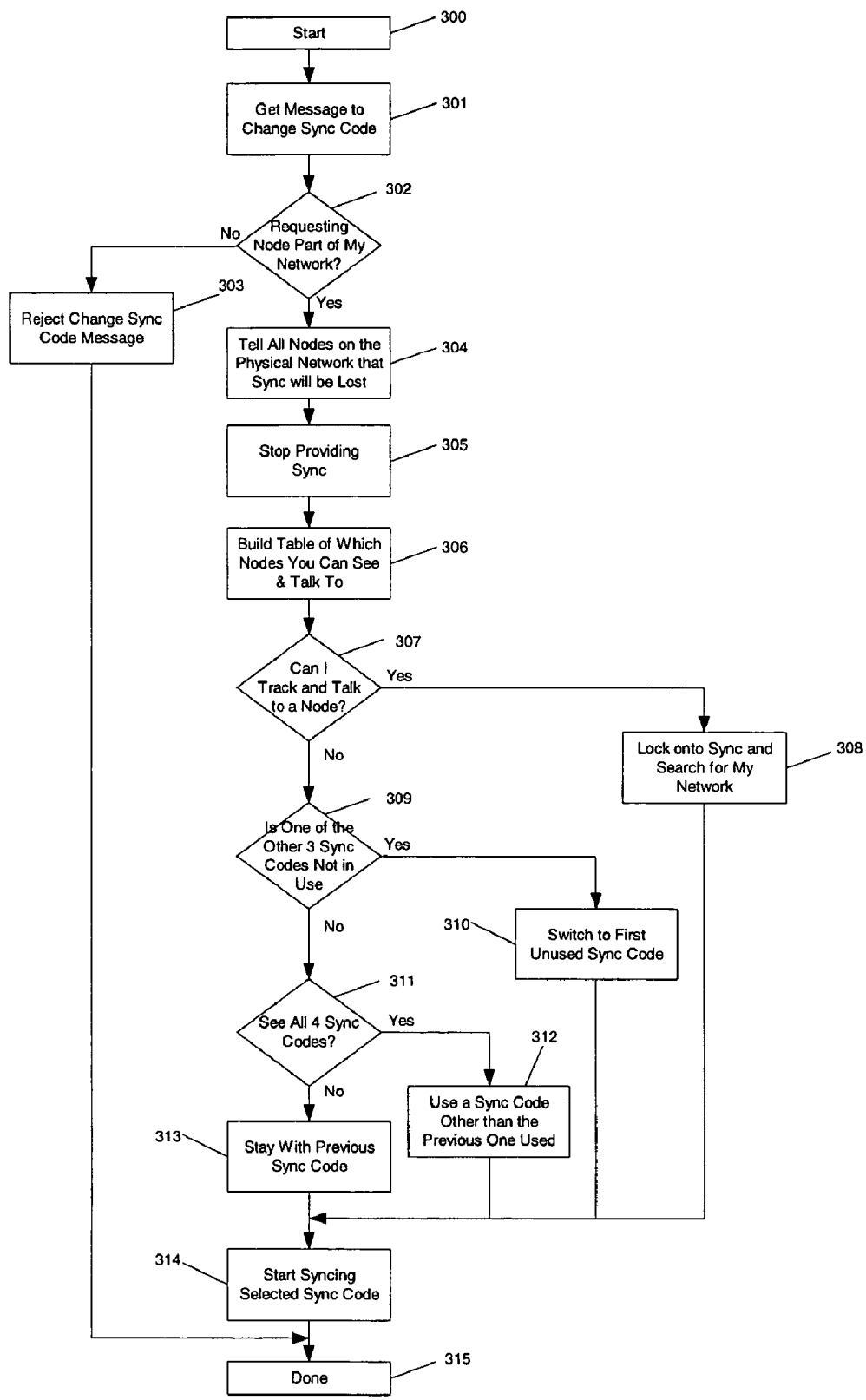
FIG. 3 is a flow diagram of the preferred process for changing the synchronization code used to isolate networks.

FIG. 3 is a flow diagram of the present preferred process for changing the synchronization code used to isolate networks. This may be necessary where there are two sync master control nodes 140, 143 providing synchronization using the same synchronization code. Each sync master control node 140, 143 may not be able to see or talk to one another, but a network node 141, 144 in between them may be able to detect both of the synchronization codes generated by each sync master control node 140, 143 and not know which synchronization code to track. By changing the synchronization code sent from one of the sync master control nodes 140, 143, the network node 141, 144 can track the correct sync master control node 140, 143. The process begins 300. A message is sent to the sync master control node 140, 143 requesting 301 the sync master control node's 140, 143 to change the sync master control node's 140, 143 synchronization code. If at test 302, the requesting network node 140, 141, 143, 144 is not a part of the sync master control node's 140, 143 logical network the sync master control node 140, 143 rejects 303 the request and the process ends 315. If at test 302, the network node 140, 141, 143, 144 was from the same logical network, the sync master control node 140, 143 informs 304 each network node 140, 141 or 143, 144 on the sync network 145 or 146 that synchronization will be lost. The sync master control node 140, 143 stops 305 providing synchronization. The sync master control node 140, 143 builds 306 a table of all the network nodes 140, 141, or 143, 144 that the sync master control node 140, 143 can talk to before the sync master control node 140, 143 stopped providing synchronization. In test 307 the sync master control node 140, 143 checks to see if there is second sync master control node 140, 143 providing synchronization. If so, the sync master control node 140, 143 locks onto the synchronization code and searches 308 for the sync master control node's 140, 143 logical network and goes to step 314. If test 307 is no, the sync master control node 140, 143 checks 309 to see if any of the other synchronization codes are not in use on the sync network 145, 146. The preferred embodiment uses four synchronization codes, but this is not a requirement. If one of the other synchronization codes is not in use, the sync master control node 140, 143 switches 310 to the first unused synchronization code and goes to step 314. Otherwise, the process continues to test 311 to see if all four synchronization codes are being used on the physical network 142. If all four synchronization codes are being used, one of the other synchronization codes is used 312. If not, the sync master control node 140, 143 uses 313 the previous synchronization code. The sync master control node 140, 143 starts providing synchronization 314 using the selected synchronization code and is complete 315.

Figure 4:
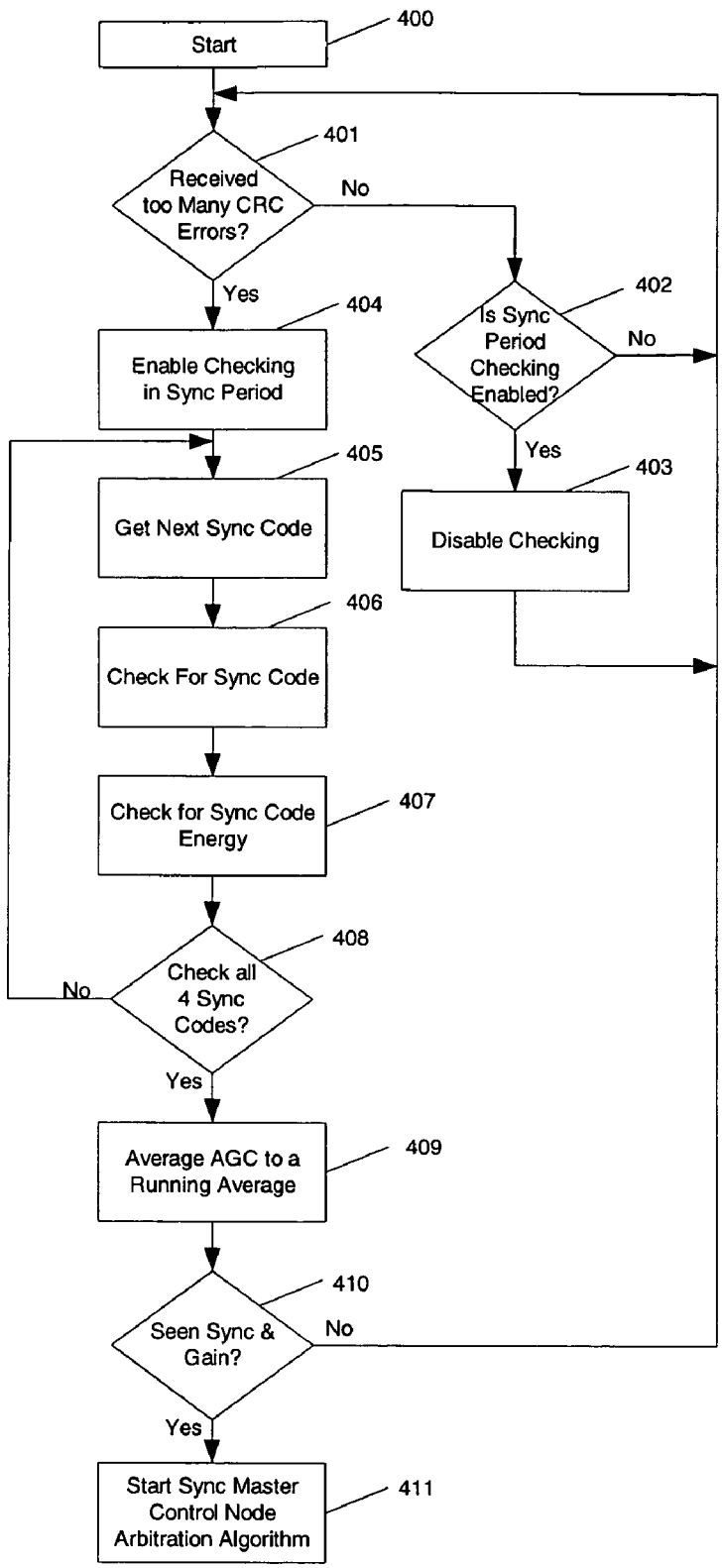
FIG. 4 is a flow diagram of the preferred process for determining which node is the Sync Master Control Node when there are two nodes providing synchronization.

FIG. 4 is a flow diagram of the present preferred process for determining which network node 140, 143 is the sync master control node 140, 143 when there are two sync master control nodes 140, 143 providing synchronization. In a power line network, network conditions change as lights are turned on and off; motors are turned on and off, or the like. This can cause conditions where there may be two sync master control nodes 140, 143 providing synchronization in close proximity. This can cause errors on the sync network 145, 146 because the synchronization codes are not synchronized to each other. Data can become corrupt in non-synchronization time slots as the synchronization codes and data overlap. The process starts 400. A sync master control node 140, 143 checks 401 one or more time slots 120-136 for a threshold of errors over time or some other error threshold or combination of errors. The present preferred embodiment uses CRC errors for the threshold, but other error thresholds such as forward error correction errors and the like can be used as well. If the threshold has not been met 401, the sync master control node 140, 143 checks to see if the synchronization period checking is enabled in test 402. Synchronization period checking is the process that a sync master control node 140, 143 uses to look for synchronization codes in time slots 120-136. If the sync master control node 140, 143 sees a synchronization code in a time slot 120-136, there may be another sync master control nodes 140, 143 providing synchronization in close proximity. If not enabled, in step 402, the process checks 401 for too many CRC errors. Otherwise, the process disables 403 the checking and tests 401 for too many receive errors. This is to allow for when a large number of errors occur due to noise or some other reason and not another sync master control node 140, 143 providing synchronization. If at test 401, the threshold has been met, the synchronization period checking begins 404. The process gets 405 the next synchronization code and checks 406 for the synchronization code over a period of time. The sync master control node 140, 143 checks 407 for sync code energy within a time slot 120-136. Hardware detection circuitry is used for detection of synchronization codes. This information is read via registers in the hardware. All the synchronization codes are checked in test 408. If all the codes have not been checked the process gets 405 the next synchronization code. Otherwise, the sync master control node 140, 143 completes a running average test of the Automatic Gain Control (AGC) to determine if a synchronization code was seen 409. If a second synchronization code was not seen at test 410, the process checks 401 to see if there are too many CRC errors. Otherwise, the sync master control node arbitration algorithm begins 411 (step 100 in FIG. 1c).

These data synchronization methods and systems are designed so these data synchronization methods and systems will run over a variety of networks, but are not limited to such types of networks as AC power line, DC power line, light frequency (fiber, infrared, light, and the like), Radio Frequency (RF) networks (wireless such as 802.11b, and the like), acoustic networks and wired networks (coax, twisted pair, and the like).

In addition, these data transportation methods and systems can be implemented using a variety of processes, but are not limited to computer hardware, microcode, firmware, software, and the like.

The described embodiments of this invention are to be considered in all respects only as illustrative and not as restrictive. Although specific flow diagrams are provided, the invention is not limited thereto. The scope of this invention is, therefore, indicated by the claims rather than the foregoing description. All changes, which come within the meaning and range of equivalency of the claims, are to be embraced within their scope.

The invention claimed is:

1. A method for network isolation comprising;
   A. sending a first synchronization code from a first sync master control node in a first time slot, wherein said first synchronization code is synchronized to said first sync master control node;
   B. detecting said first synchronization code in said first time slot with a first network node;
   C. creating a first sync network by having said first network node track said first synchronization code sent from said first sync master control node;
   D. sending a second synchronization code, from a second sync master control node that is not synchronized to said first sync master control node, in a second time slot, wherein said second synchronization code is synchronized to said second sync master control node;
   E. detecting said second synchronization code in said second time slot with a second network node; and
   F. creating a second sync network by having said second network node track said second synchronization code from said second sync master control node, wherein said first and second synchronization codes are not dependent on the time phase of any other node in said first sync network and second sync network, respectively, wherein said first synchronization code is sent before said first sync network is created, and wherein said second synchronization code is sent before said second sync network is created.

2. A method for network isolation as recited in claim 1, further comprising the step of subdividing said second sync network into one or more logical networks by using a network identifier.

3. A method for network isolation as recited in claim 1, wherein creating said second sync network further comprises creating said second sync network on a physical network selected from the group consisting of, a wireless network, a light frequency network, a power line network, an acoustic network, and a wired network.

4. A method for network isolation as recited in claim 1, further comprising the step of creating up to four synchronization networks using four synchronization codes.

5. A system for network isolation comprising;
   A. four or more network nodes which further comprises a first network node and a second network node;
   B. wherein said four or more network nodes further comprises a plurality of sync master control nodes which further comprises a first sync master control node and a second sync master control node;
   C. a plurality of sync networks further comprising a first sync network and a second sync network;
   D. a plurality of synchronization codes which further comprises a first synchronization code and a second synchronization code;
   E. wherein said first sync master control node sends said first synchronization code on a first time slot, wherein said first synchronization code is synchronized to said first sync master control node;
   F. wherein said first network node detects said first synchronization node and creates said first sync network by tracking said first synchronization code;
   G. wherein said second sync master control node sends said second synchronization code on a second time slot, wherein said second synchronization code is synchronized to said second sync master control node; and
   H. wherein said second network node detects said second synchronization code and creates said second sync network by tracking said second synchronization code, wherein said first synchronization code is sent before said first sync network is created, wherein said second synchronization code is sent before said second sync network is created, and wherein said first and second synchronization codes are configured to not allow synchronization to occur between said first and second sync networks.

6. A system for network isolation as recited in claim 5, wherein said plurality of sync networks is further subdivided into logical networks using a network identifier.

7. A system for network isolation as recited in claim 5, wherein said plurality of networks comprises a physical network selected from the group consisting of a power line network, a wireless network, light frequency network, an acoustic network, and a wired network.

8. A system for network isolation as recited in claim 5, wherein said plurality of synchronization codes is four synchronization codes.

9. The method for network isolation of claim 1, wherein said first and second synchronization codes each comprise a binary number.

10. The method for network isolation of claim 1, wherein creating said first sync network further comprises creating said first sync network on a power line network, and wherein creating said second sync network further comprises creating said second sync network on said power line network.

* * * * *

UNITED STATES PATENT AND TRADEMARK OFFICE
CERTIFICATE OF CORRECTION

PATENT NO. : 7,305,476 B2  Page 1 of 1
APPLICATION NO. : 10/770057
DATED : December 4, 2007
INVENTOR(S) : Lyman D. Horne et al.

It is certified that error appears in the above-identified patent and that said Letters Patent is hereby corrected as shown below:

Column 2, line 34, cancel the text beginning "FIG. 2 is a flow" to and ending "Control Node" in column 2, line 36, and insert the following paragraph:

-- FIG. 2 is a flow diagram of the preferred process a node goes through to determine if it is the Sync Master Control Node. --

Column 5, line 7, cancel the text beginning "If not, the process" to and ending "master node arbitration" and insert the following text:

-- If not, the process goes to the start of the master node arbitration --

In the drawings, Sheet 3, Fig. 1c, the box marked as reference numeral 111, cancel the text that says "Send Packet to See if it any devices from Our Logical Network?" and insert the following text:

-- Send Packet to See if any devices from our Logical Network are active. --

Signed and Sealed this

Twenty-ninth Day of April, 2008

JON W. DUDAS
*Director of the United States Patent and Trademark Office*